(12) United States Patent
Miyazawa

(10) Patent No.: US 7,796,196 B2
(45) Date of Patent: Sep. 14, 2010

(54) PICTURE SIGNAL PROCESSOR AND PICTURE SIGNAL PROCESSING METHOD

(75) Inventor: Hirotoshi Miyazawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1049 days.

(21) Appl. No.: 11/493,639

(22) Filed: Jul. 27, 2006

(65) Prior Publication Data

US 2007/0024759 A1 Feb. 1, 2007

(30) Foreign Application Priority Data

Jul. 29, 2005 (JP) .............................. 2005-220364

(51) Int. Cl.
 H04N 9/69 (2006.01)
 H04N 5/20 (2006.01)
 H04N 1/60 (2006.01)
(52) U.S. Cl. .................. 348/674; 348/675; 348/650; 348/631; 348/255; 382/167; 382/274; 358/518
(58) Field of Classification Search .................. 348/675, 348/631, 687, 673, 674, 650, 617, 621, 253, 348/254, 255; 382/167, 274, 275; 358/518, 358/519, 520; 345/690, 63, 72, 77
See application file for complete search history.

(56) References Cited

U.S. PATENT DOCUMENTS

| | | | |
|---|---|---|---|
| 5,526,058 A | 6/1996 | Sano et al. | |
| 5,654,607 A | 8/1997 | Yamaguchi et al. | |
| 6,320,668 B1 * | 11/2001 | Kim ........................... | 358/1.1 |
| 7,327,878 B2 * | 2/2008 | Nakabayashi et al. ....... | 382/167 |
| 2004/0246277 A1 | 12/2004 | Abe et al. | |

FOREIGN PATENT DOCUMENTS

| | | |
|---|---|---|
| JP | 6-54339 | 2/1994 |
| JP | 9-258685 | 10/1997 |
| JP | 2000-115799 | 4/2000 |
| JP | 2003-101815 | 4/2003 |

OTHER PUBLICATIONS

Notice of Reasons for Rejection issued by the Japanese Patent Office in Japanese Patent Application No. 2005-220364, mailed Feb. 9, 2010.
Notice of Reasons for Rejection Mailed Jun. 1, 2010, in corresponding Japanese Patent Application No. 2005-220364, and English language translation thereof.

* cited by examiner

*Primary Examiner*—David L Ometz
*Assistant Examiner*—Jean W Désir
(74) *Attorney, Agent, or Firm*—Finnegan, Henderson, Farabow, Garrett & Dunner, L.L.P.

(57) ABSTRACT

According to one embodiment, in the case where a non-linear correction processing is performed in a direction in which an amplitude level of a luminance signal is heightened, an amplitude level correction processing is performed to a color signal on the basis of a first coefficient read from a first table prepared in advance in correspondence to the case. In the case where a non-linear correction processing is performed in a direction in which the amplitude level of the luminance signal is lowered, an amplitude level correction processing is performed to the color signal on the basis of a second coefficient read from a second table prepared in advance in correspondence to the case.

11 Claims, 12 Drawing Sheets ically known, flat panel-type large-screen displays have been developed in recent years, and have been put to practical use in color television broadcast receivers and the like. Then, in this kind of large-screen displays, a non-linear correction processing is performed to a luminance component of a picture signal in order to allow a display image to be clearly displayed, so that an amplitude level of the color signal is corrected in accordance with a ratio in amplitude level between the luminance signals before and after the non-linear correction processing.

PICTURE SIGNAL PROCESSOR AND PICTURE SIGNAL PROCESSING METHOD

CROSS-REFERENCE TO RELATED APPLICATIONS

This application is based upon and claims the benefit of priority from Japanese Patent Application No. 2005-220364, filed Jul. 29, 2005, the entire contents of which are incorporated herein by reference.

BACKGROUND

1. Field

One embodiment of the invention relates to improvements of a picture signal processor and a picture signal processing method, the processor performing an amplitude correction processing to a color signal in accordance with the a change amount of a luminance signal by means of a non-linear correction processing.

2. Description of the Related Art

As is already known, flat panel-type large-screen displays have been developed in recent years, and have been put to practical use in color television broadcast receivers and the like. Then, in this kind of large-screen displays, a non-linear correction processing is performed to a luminance component of a picture signal in order to allow a display image to be clearly displayed, so that an amplitude level of the color signal is corrected in accordance with a ratio in amplitude level between the luminance signals before and after the non-linear correction processing.

However, in the amplitude correction processing with respect to the color signal, no particular disadvantage is detected in the case where the non-linear correction processing is performed in a direction in which, for example, an amplitude level of a luminance signal is heightened. On the other hand, in the case where the non-linear correction processing is performed in a direction in which the amplitude level of the luminance signal is lowered, there is shown a phenomenon in which colors are darkened. For example, there is generated a phenomenon in which vividness of images is damaged at the time of displaying, for example, the red color of apples or the like.

For example, Jpn. Pat. Appln. KOKAI No. 2000-115799 discloses a configuration in which a difference between a luminance signal input to a gamma correction circuit and a luminance signal output from the gamma correction circuit is calculated to determine a change amount of the luminance signal by means of gamma correction, so that a color-difference signal is uniformly amplified with a gain corresponding to the change amount to control chroma thereof. Thus, the above-described phenomenon is generated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, in the case where a non-linear correction processing is performed in a direction in which an amplitude level of a luminance signal is heightened, an amplitude level correction processing is performed to a color signal on the basis of a first coefficient read from a first table prepared in advance in correspondence to the case. In the case where a non-linear correction processing is performed in a direction in which the amplitude level of the luminance signal is lowered, an amplitude level correction processing is performed to the color signal on the basis of a second coefficient read from a second table prepared in advance in correspondence to the case.

Figure 1:
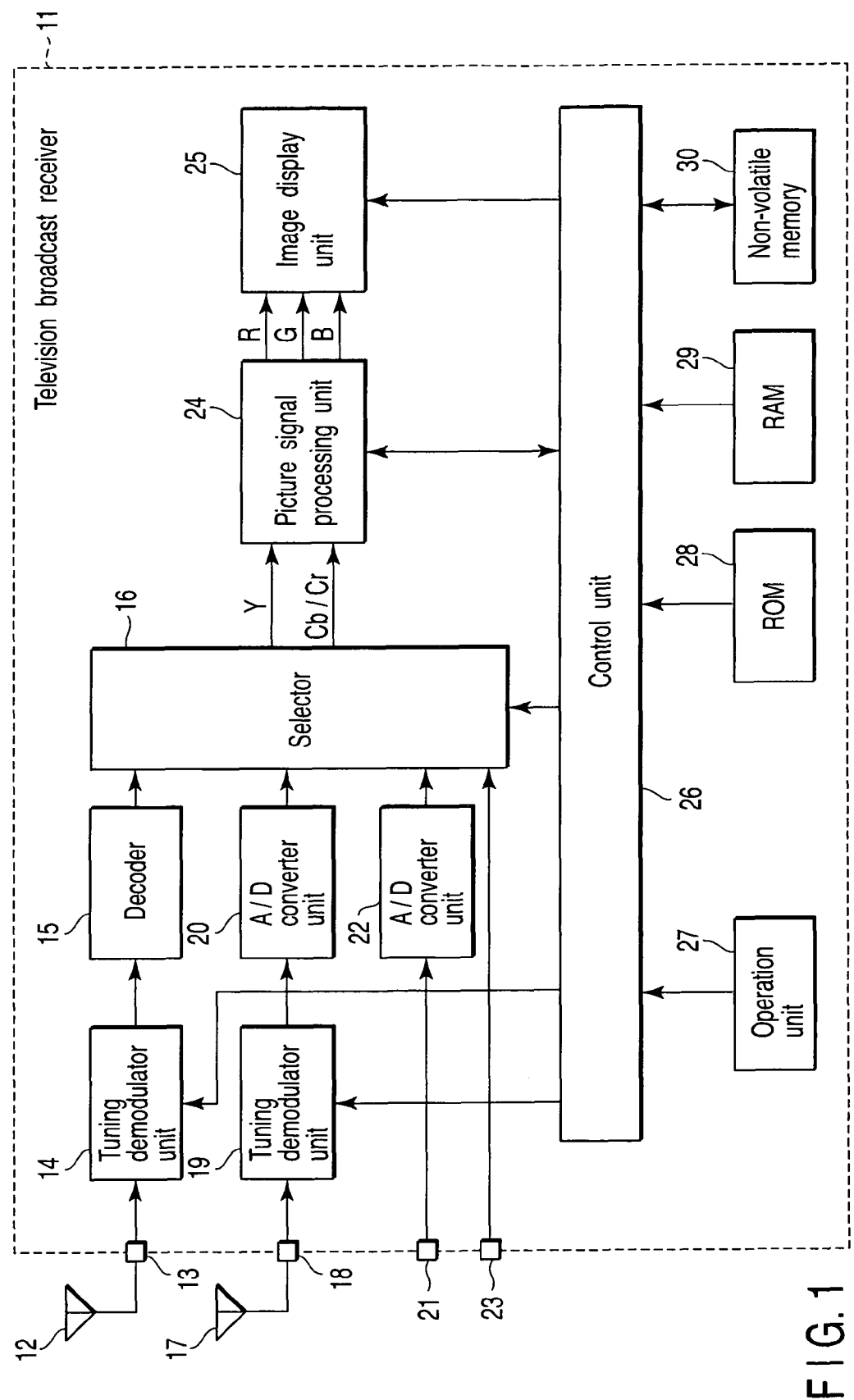
FIG. 1 is a block diagram showing one embodiment of the present invention, the diagram being shown for explaining a picture signal processing system of a television broadcast receiver.

FIG. 1 schematically shows a picture signal processing system of a television broadcast receiver 11 which is explained in the present embodiment.

That is, a digital television broadcast signal received by an antenna 12 for receiving digital television broadcast is supplied to a tuning demodulator unit 14 via an input terminal 13. The tuning demodulator unit 14 tunes a broadcast signal of a desired channel from the input digital television digital television broadcast signal, and demodulates the tuned signal to output the signal to a decoder 15.

Then, the decoder 15 generates a digital luminance signal Y and a color signal Cb/Cr respectively by performing a decoding processing to the signal input from the tuning demodulator unit 14, and outputs the digital luminance signal Y and the color signal Cb/Cr to a selector 16.

Furthermore, an analog television broadcast signal received by an antenna 17 for receiving analog television broadcast is supplied to a tuning demodulator unit 19 via an input terminal 18. The tuning demodulator unit 19 tunes a broadcast signal of a desired channel from the input analog television broadcast signal, and demodulates the tuned signal to generate an analog luminance signal Y and a color signal Cb/Cr, respectively.

Then, after the analog luminance signal Y and the color signal Cb/Cr generated in the tuning demodulator unit 19 are supplied to an A/D (analog/digital) converter unit 20 to be converted into the digital luminance signal Y and the color signal Cb/Cr, the digital luminance signal Y and the color signal Cb/Cr are output to the selector 16.

Further, after the analog luminance signal Y and the color signal Cb/Cr supplied to an external input terminal 21 for analog picture signal are supplied to an A/D converter unit 22 to be converted into the digital luminance signal Y and the color signal Cb/Cr, the digital luminance signal Y and the color signal Cb/Cr are output to the selector 16. Furthermore, the digital luminance signal Y and the color signal Cb/Cr supplied to an external outside input terminal 23 for digital picture signal are supplied to the selector 16 as they are.

Here, the selector 16 selects any one of the digital luminance signals Y and the color signals Cb/Cr supplied respectively from the decoder 15, the A/D converter units 20, 22 and the external input terminal 23, and supplies the selected signal to a picture signal processing unit 24.

Although the details will be described later, the picture signal processing unit 24 generates R(red), G(green), and B(blue) signals by performing a predetermined signal processing to the input digital luminance signal Y and the color signal Cb/Cr.

Then, R, G and B signals generated by the picture signal processing unit 24 are supplied to an image display unit 25 to provide the image display. For example, a flat panel display composed of a liquid crystal display, a plasma display or the like is adopted as the image display unit 25.

Here, various operations of the television broadcast receiver 11 including various receiving operations described above are uniformly controlled by a control unit 26. The control unit 26 is a micro processor incorporating a central processing unit (CPU) and the like. The control unit 26 receives operation information from an operation unit 27 including a remote controller (not shown) to respectively control each unit in such a manner that the operation contents thereof are reflected.

In this case, the control unit 26 primarily utilizes a read only memory (ROM) 28 having stored therein a control program executed by the CPU, a random access memory (RAM) 29 for providing a work area to the CPU, and a non-volatile memory 30 which stores various set information, control information and the like.

Figure 2:
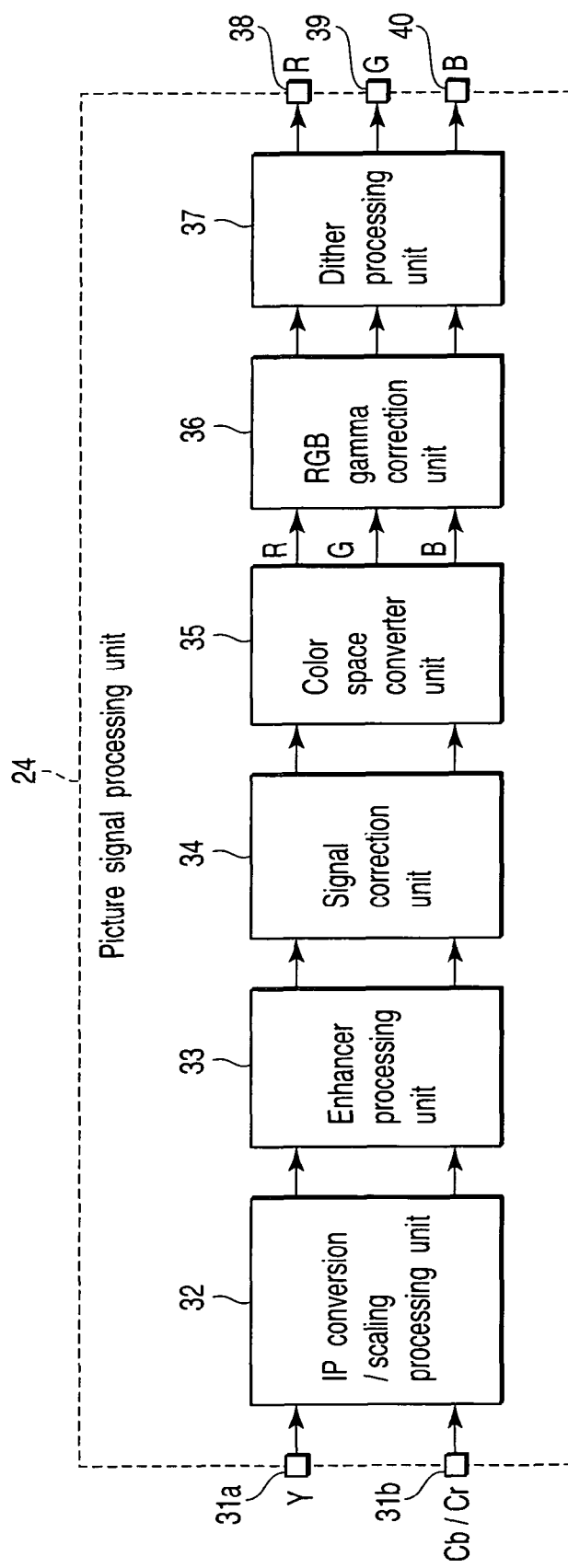
FIG. 2 is a block diagram shown for explaining in detail a picture signal processing unit of the television broadcast receiver in the embodiment.

FIG. 2 shows one example of the picture signal processing unit 24. That is, the digital luminance signal Y and the color signal Cb/Cr selected by the selector 16 are supplied to an IP (interlace progressive) conversion/scaling processing unit 32 via input terminals 31a and 31b.

The IP conversion/scaling processing unit 32 performs a progressive conversion processing and a scaling processing to the input luminance signal Y and color signal Cb/Cr in order to provide a display on the image display unit 25 (a flat panel display composed of a liquid crystal display, a flat panel display or the like), and the unit 32 outputs the input luminance signal Y and color signal Cb/Cr to an enhancer processing unit 33.

The enhancer processing unit 33 provides steeper rise in vertical and horizontal directions with respect to the input luminance signal Y and color signal Cb/Cr, or performs enhancing processing for changing a sharpness thereof to output the signals to a signal correction unit 34.

The signal correction unit 34 applies a non-linear correction processing for gradation correction with respect to the input luminance signal Y and applies an amplitude control processing to the color signal Cb/Cr along with the non-linear correction processing to output the signals to a color space converter unit 35.

The color space converter unit 35 converts the input luminance signal Y and color signal Cb/Cr to R, G and B signals to be output to an RGB gamma correction unit 36. The RGB gamma correction unit 36 makes a white balance adjustment to the input R, G and B signals, and applies a gamma correction processing with respect to the image display unit 25 to output the signals to a dither processing unit 37.

Then, the dither processing unit 37 performs a compression processing with respect to the input R, G and B signals, and then outputs the signals to the image display unit 25 via output signals 38, 39 and 40. The compression processing converts a high gradation bit expression in which a bit number is extended for increasing expressiveness into a low gradation bit number corresponding to the image display unit 25

Figure 3:
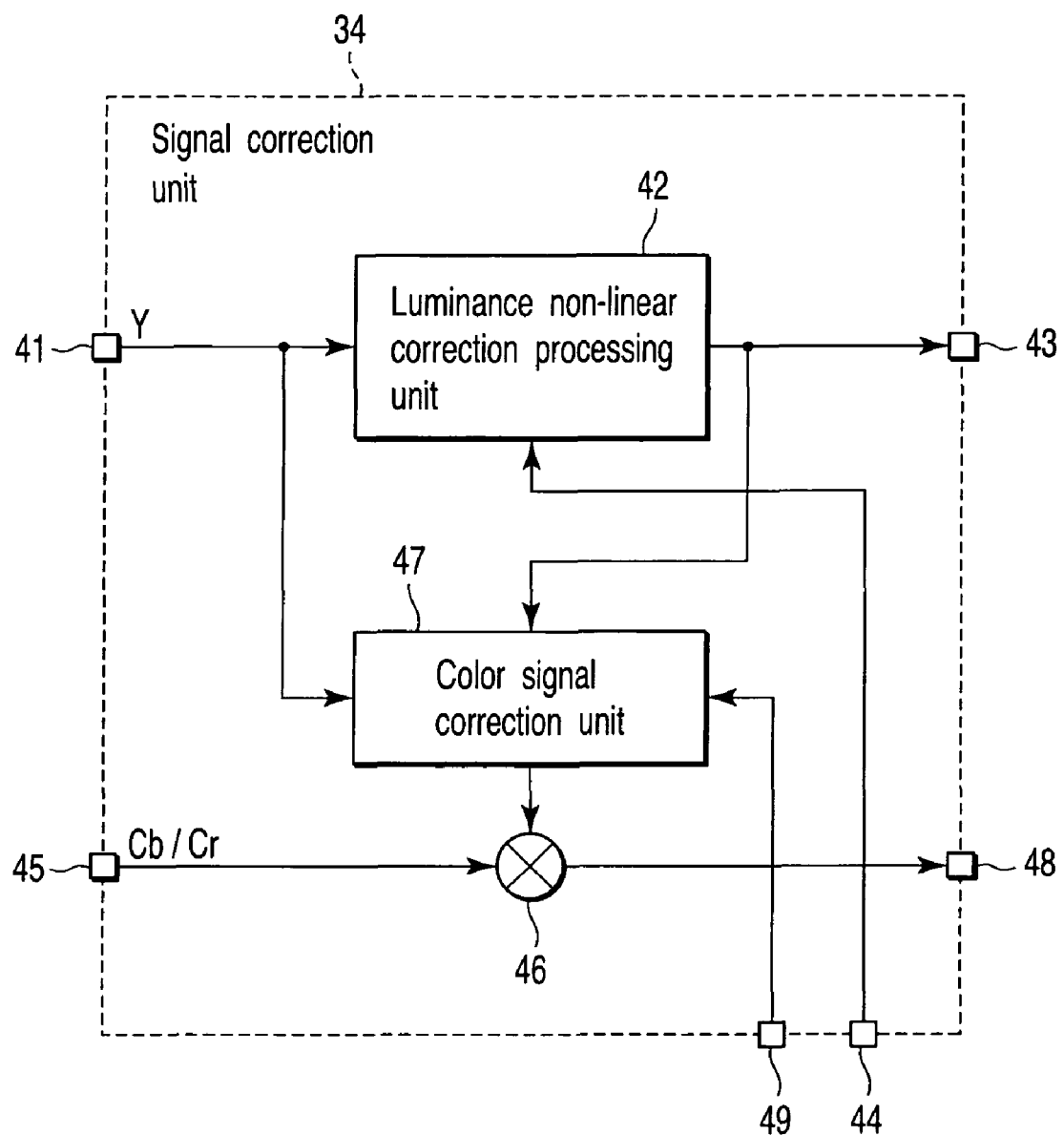
FIG. 3 is a block diagram shown for explaining in detail a signal correction unit of the picture signal processor in the embodiment.

FIG. 3 shows one example of the signal correction unit 34. That is, the luminance signal Y output from the enhancer processing unit 33 is supplied to a luminance non-linear correction processing unit 42 via an input terminal 41, and is subjected to a non-linear correction processing for gradation correction. Thereafter, the signal is output to the color space converter unit 35 via an output terminal 43.

Here, although the details will be described later, the luminance non-linear correction processing unit 42 creates a look-up table (LUT) for luminance non-linear correction processing on the basis of a conversion parameter which is supplied from the control unit 26 via a control terminal 44, and applies a non-linear correction processing to the luminance signal Y on the basis of the LUT.

Furthermore, the color signal Cb/Cr output from the enhancer processing unit 33 is supplied to a multiplier 46 via an input terminal 45, so that a color correction coefficient output from the color signal correction unit 47 is multiplied to perform an amplitude control processing. Thereafter, the signal is output to the color space converter unit 35 via an output terminal 48.

Although the details will be described later, the color signal correction unit 47 performs a correction processing based on a level change of the luminance signals Y before and after the luminance non-linear correction processing unit 42 with respect to an initial template for color correction which is supplied from the control unit 26 via a control terminal 49. As a result, a color correction coefficient which provides a color gain for performing an amplitude control with respect to the color signal Cb/Cr is generated to be output to the multiplier 46.

Figure 4:
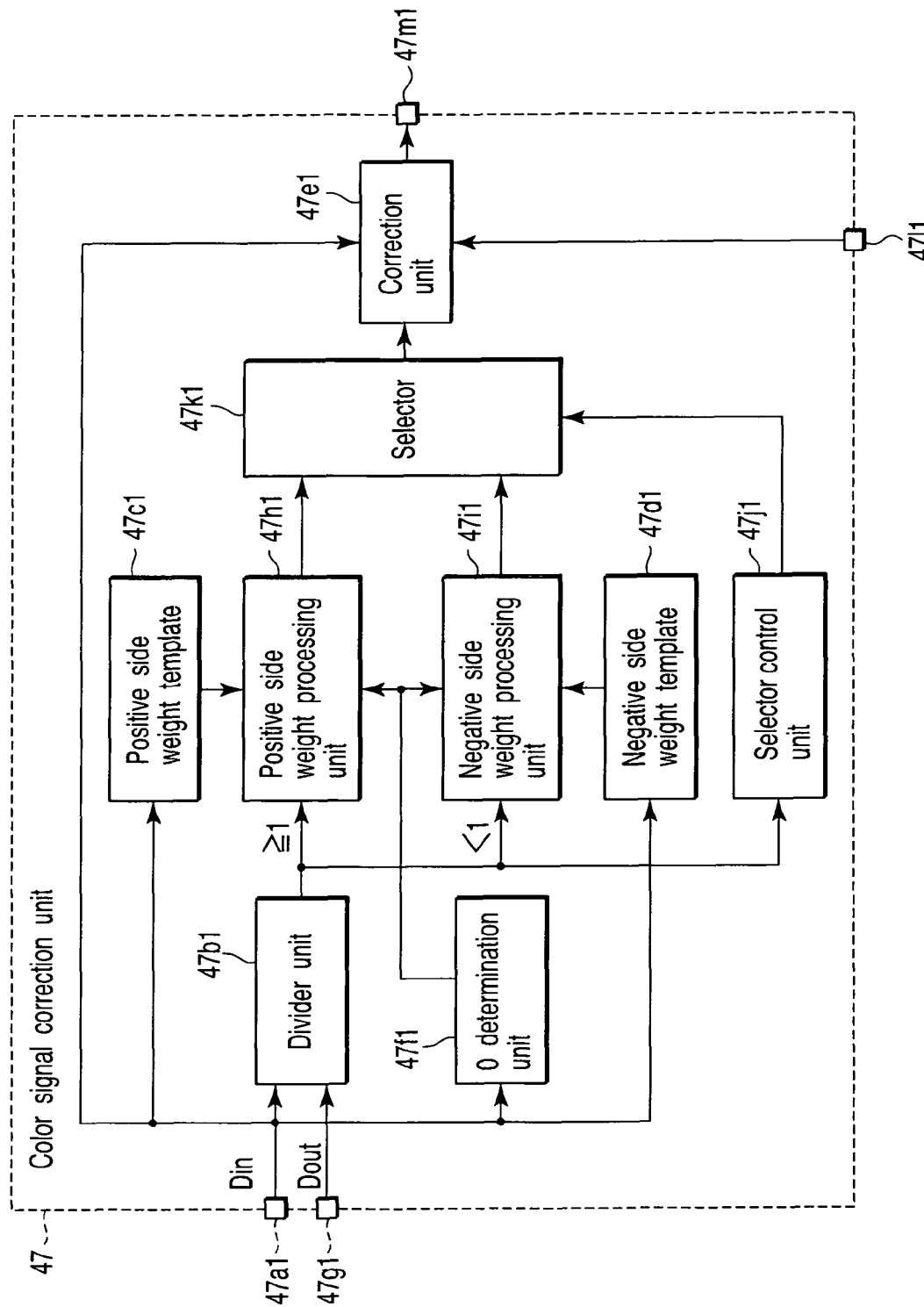
FIG. 4 is a block diagram shown for explaining one example of a color signal correction unit in the signal correction unit in the embodiment.

FIG. 4 shows one example of the signal correction unit 47. That is, a luminance signal Din before the non-linear correction processing by means of the non-linear correction processing unit 42 passes through an input terminal 47a1, and then supplied respectively to a divider unit 47b1, a positive side weight template 47c1, a negative side weight template 47d1, a correction unit 47e1 and a 0 determination unit 47f1.

A luminance signal Dout after the non-linear correction processing by means of the luminance non-linear correction processing unit 42 is supplied to the divider unit 47b1 via an input terminal 47g1. The divider unit 47b1 divides the input luminance signal Dout by the luminance signal Din. More specifically, the calculation of Dout/Din is performed to calculate a luminance signal input/output ratio.

Then, the luminance signal input/output ratio which is a calculation result of the divider unit 47b1 is supplied respectively to a positive side weight processing unit 47h1, a negative side weight processing unit 47i1, and a selector control unit 47j1. In the case where with respect to the positive side weight processing unit 47h1 out of the units, the input luminance signal input/output ratio is 1 or more, that is, the non-linear correction processing is performed in a direction in which an amplitude level of the luminance signal is heightened, a positive side weighting processing is performed by using the positive side weight template 47c1.

More specifically, the positive side weight template 47c1 is set in advance in correspondence to the case in which the luminance signal input/output ratio is 1 or more. The positive side weight template 47c1 is a table parameter in which an amplitude level of the luminance signal Din and a weighting coefficient are made to correspond to each other. The positive side weight processing unit 47h1 reads a weighting coefficient corresponding to the amplitude level of the luminance signal Din from the positive side weight template 47c1, multiplies the luminance signal input/output ratio by the read weighting coefficient, and outputs the obtained value to one of input terminals of a selector 47k1.

In addition, the negative side weight processing unit 47i1 performs a negative side weighting processing using the negative side weight template 47d1 in the case where the input luminance signal input/output ratio is less than 1, that is, the non-linear correction processing is performed in a direction in which the amplitude level of the luminance signal is lowered.

More specifically, the negative side weight template 47d1 is set in advance in correspondence to the case in which the luminance signal input/output ratio is less than 1. The negative side weight template 47d1 is a table parameter in which an amplitude level of the luminance signal Din and a weighting coefficient are made to correspond to each other. The negative side weight processing unit 47i1 reads a weighting coefficient corresponding to the amplitude level of the luminance signal Din from the negative side weight template 47d1, multiplies the luminance signal input/output ratio by the read weighting coefficient, and outputs the obtained value to the other input terminal of the selector 47k1.

The selector 47k1 is controlled by the selector control unit 47j1. That is, when the input luminance signal input/output ratio is 1 or more, the selector control unit 47j1 controls the selector 47k1 such that an output of the positive side weight processing unit 47h1 is supplied to the correction unit 47e1. On the other hand, when the luminance signal input/output ratio is less than 1, the selector control unit 47j1 controls the selector 47k1 such that an output of the negative side weight processing unit 47i1 is supplied to the correction unit 47e1.

To the correction unit 47e1, an initial template for color correction processing is supplied from the control unit 26 via the control terminal 49 and a control terminal 47l1. The initial template is set in advance for performing a basic correction processing with respect to the color signal, and the initial template is a table parameter in which an amplitude level of the luminance signal Din and a reference correction value corresponding to the color signal are made to correspond to each other.

The correction unit 47e1 reads a reference correction value corresponding to the amplitude level of the luminance signal Din from the initial template, and creates the color correction coefficient by adding an output from the selector 47k1 to the read reference correction value. Then, the correction unit 47e1 outputs the correction coefficient to the multiplier 46 via an output terminal 47m1.

Incidentally, the 0 determination unit 47f1 is prepared for performing a division procedure in the case where the amplitude of the luminance signal Din which forms a denominator becomes 0 at the time of calculating the luminance signal input/output ratio. That is, in the case where the 0 determination unit 47f1 detects the fact that the amplitude level of the luminance signal becomes 0, the 0 determination unit 47f1 controls the positive side and negative side weight processing units 47h1 and 47i1 such that the same operation is performed as in the case where the luminance signal input/output ratio is 1.

Figure 5:
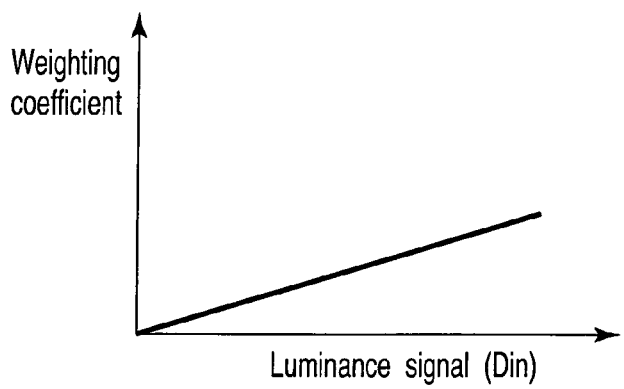
FIG. 5 is a view shown for explaining a characteristic of a positive side weight template of the color signal correction unit in the embodiment.

Here, FIG. 5 shows one example of a relation between the amplitude level of the luminance signal Din and the weighting coefficient in the positive side weight template 47c1. That is, in the positive side weight template 47c1, a characteristic is provided such that the weighting coefficient is enlarged in proportion to the enlargement of the amplitude level of the luminance signal Din.

Figure 6:
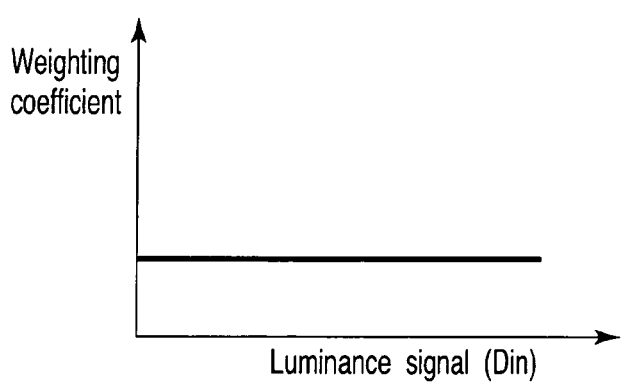
FIG. 6 is a view shown for explaining a characteristic of a negative side weight template of the color signal correction unit in the embodiment.

On the other hand, FIG. 6 shows one example of a relation between the amplitude level of the luminance signal Din and the weighting coefficient in the negative side weight template 47d1. That is, in the negative side weight template 47d1, a characteristic is provided such that the weighting coefficient is substantially constant irrespective of the amplitude level of the luminance signal Din.

In this manner, the weighting coefficient for providing an amplitude correction processing to the color signal is differed between the case in which the luminance signal input/output ratio is 1 or more, namely, non-linear correction processing is performed in a direction in which the amplitude level of the luminance signal is heightened and the case in which the luminance signal input/output ratio is less than 1, namely the non-linear correction processing is performed in a direction in which the amplitude level of the luminance signal is lowered.

Figure 7:
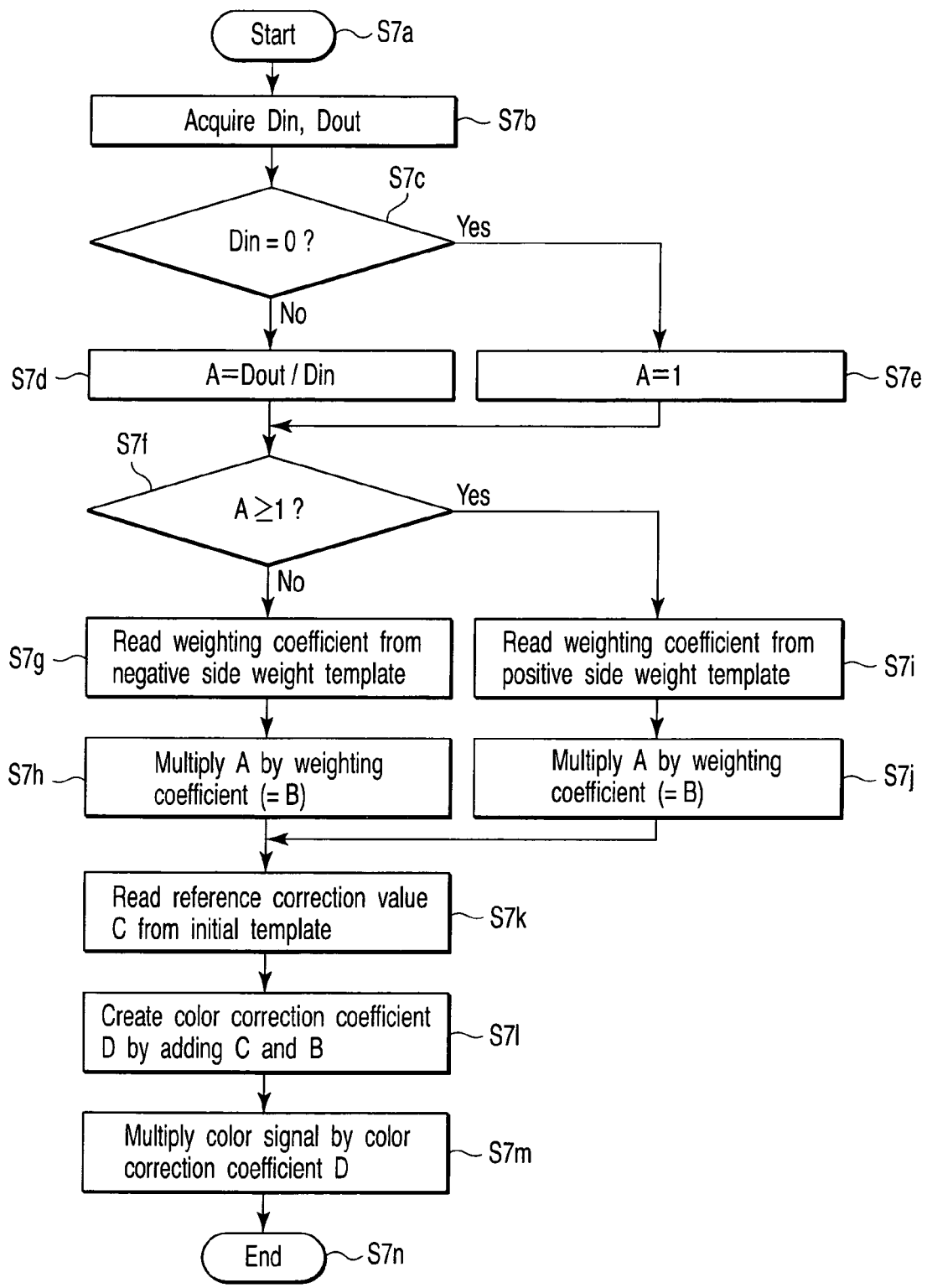
FIG. 7 is a flow chart shown for explaining a processing operation of the color signal correction unit in the embodiment.

FIG. 7 is a flow chart in which the processing operation of the color signal correction unit 47 shown in FIG. 4 is summarized. When the processing is started (in block S7a), the divider unit 47b1 acquires the luminance signals Din and Dout before and after the non-linear correction processing by means of the luminance non-linear correction processing unit 42 in block S7b.

Thereafter, the 0 determination unit 47f1 determines in block S7c whether or not the amplitude level of the luminance signal Din is 0. When it is determined that the amplitude level of the luminance signal Din is not 0 (NO), the divider unit 47b1 calculates in block S7d the luminance signal input/output ratio A=Dout/Din. On the other hand, when it is determined that the amplitude level of the luminance signal Din is 0 (YES), the 0 determination unit 47f1 sets the luminance signal input/output ratio A=1 with respect to the positive side and negative side weight processing units 47h1 and 47i1 in block S7e.

Then, after the block S7d or block S7e, the positive side and negative side weight processing units 47h1 and 47i1 respectively determine in block S7f whether or not the luminance signal input/output ratio is 1 or more.

Here, when it is determined that the luminance signal input/output ratio A is less than 1 (NO), the negative side weight processing unit 47i1 reads in block S7g a weighting coefficient corresponding to the amplitude level of the luminance signal Din from the negative side weight template 47d1, and multiplies the luminance signal input/output ratio A by the read weighting coefficient in block S7h. The calculation result at this time is denoted by symbol B.

On the other hand, when it is determined that the luminance signal input/output ratio A is 1 or more (YES), the positive side weight processing unit 47h1 reads in block S7i a weighting coefficient corresponding to the amplitude level of the luminance signal Din from the positive side weight template 47c1, and multiplies the luminance signal input/output ratio A by the read weighting coefficient in block S7j. The calculation result at this time is denoted by symbol B.

After the block S7h or the block S7j, the correction unit 47e1 reads a reference correction value C corresponding to the amplitude level of the luminance signal Din from the initial template in block S7k. In block S7l, the multiplication result acquired in block S7h or block S7j is added to the read reference correction value C to create a color correction coefficient D.

Thereafter, the multiplier 46 multiplies in block S7m the color signal Cb/Cr by the color correction coefficient D to terminate the processing (in block S7n). As a result, the amplitude correction processing with respect to the color signal Cb/Cr is performed.

In the color signal correction unit 47 shown in FIG. 4, the positive side weight template 47c1 and the negative side weight template 47d1 are prepared. The weighting coefficient is differed between the case in which the non-linear correction processing is performed in a direction in which the amplitude level of the luminance signal is heightened and the case in which the non-linear correction processing is performed in a direction in which the amplitude level of the luminance signal is lowered. As a consequence, the amplitude correction processing can be performed with respect to the color signal such that the image display can be provided in clear colors by suppressing the darkening and black stains of colors in the dark portions and the bright portions of the luminance.

Figure 8:
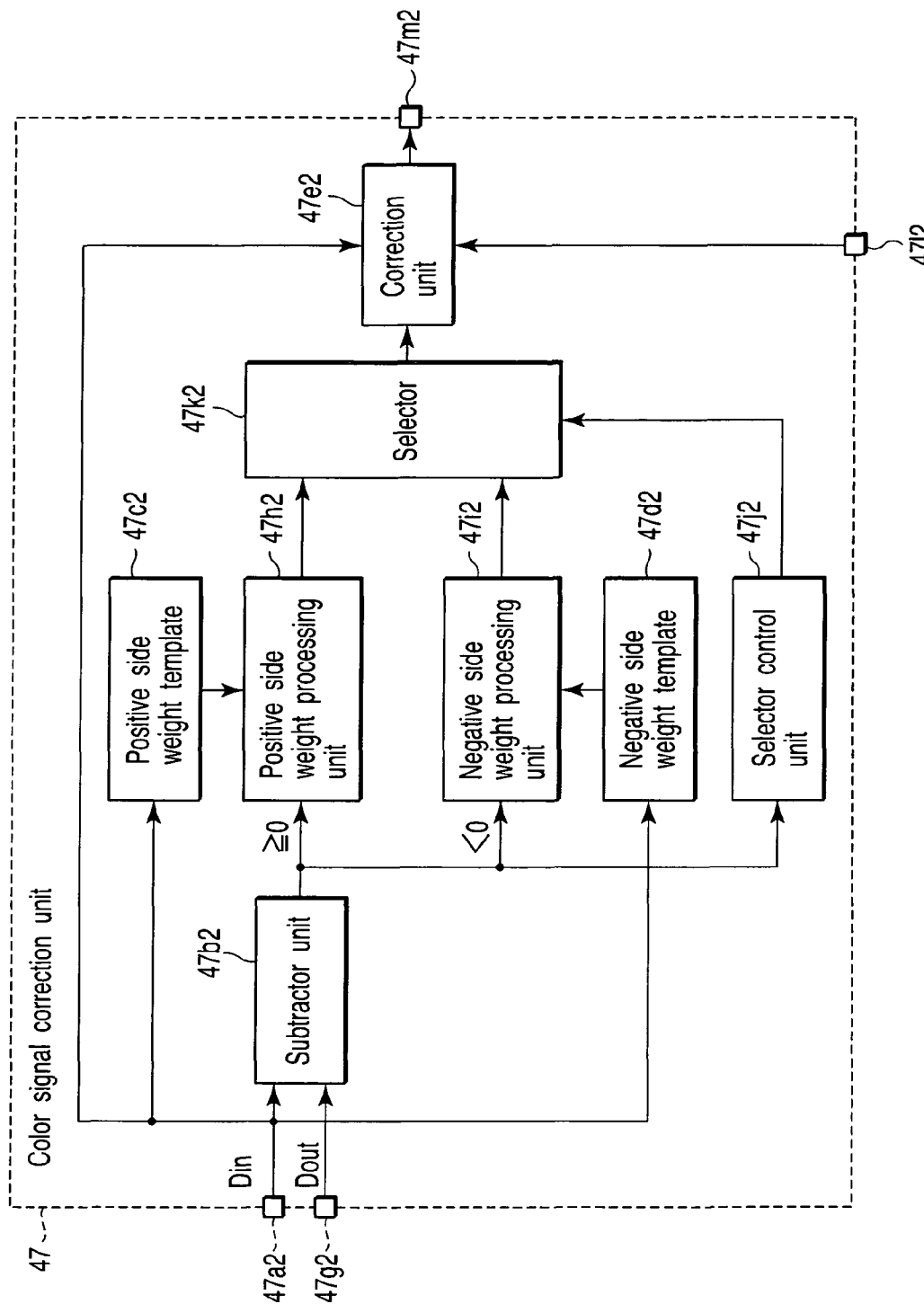
FIG. 8 is a block diagram shown for explaining another example of the color signal correction unit of the signal correction unit in the embodiment.

FIG. 8 shows another example of the color signal correction unit 47. More specifically, the luminance signal Din before the non-linear correction processing is performed by the luminance non-linear correction processing unit 42 passes through an input terminal 47a2, and then supplied respectively to a subtractor unit 47b2, a positive side weight template 47c2, a negative side weight template 47d2 and a correction unit 47e2.

Furthermore, the luminance signal Dout after the non-linear correction processing by means of the luminance non-linear correction processing unit 42 is supplied to the subtractor unit 47b2 via an input terminal 47g2. The subtractor unit 47b2 subtracts the luminance signal Din from the input luminance signal Dout. That is, the calculation of Dout−Din is performed so that a luminance signal input/output difference is calculated.

Then, the luminance signal input/output difference which is a calculation result of the subtractor unit 47b2 is supplied respectively to a positive side weight processing unit 47h2, a negative weight processing unit 47i2 and a selector control unit 47j2. Out of the units, the positive side weight processing unit 47h2 performs a positive side weight processing using the positive side weight template 47c2 in the case where the input luminance signal input/output difference is 0 or more, namely, the non-linear correction processing operation is performed in a direction in which the amplitude level of the luminance signal is heightened.

That is, the positive side weight template 47c2 is set in advance in the case where the luminance signal input/output difference is 0 or more, and the positive side weight template 47c2 is a table parameter in which an amplitude level of the luminance signal Din and a weighting coefficient are made to correspond to each other. Then, the positive side weight processing unit 47h2 reads a weighting coefficient corresponding to the amplitude level of the luminance signal Din from the positive side weight template 47c2, multiplies the luminance signal input/output difference by the read weighting coefficient, and outputs the obtained value to one input terminal of a selector 47k2.

In addition, the weight processing unit 47i2 performs a negative side weight processing using the negative side weight template 47d2 in the case where the input luminance signal input/output difference is less than 0, namely, the non-linear correction processing is performed in a direction in which the amplitude level of the luminance signal is lowered.

That is, the negative side weight template 47d2 is set in advance in correspondence to the case in which the luminance signal input/output difference is less than 0, and the negative side weight template 47d2 is a table parameter in which an amplitude level of the luminance signal Din and a weighting coefficient are made to correspond to each other. The negative side weight processing unit 47i2 reads a weighting coefficient corresponding to the amplitude level of the luminance signal Din from the negative side weight template 47d2, multiplies the luminance signal input/output difference by the read weighting coefficient, and outputs the obtained value to the other input terminal of the selector 47k2.

The selector 47k2 is controlled by the selector control unit 47j2. More specifically, the selector control unit 47j2 controls the selector 47k2 such that an output of the positive side weight processing unit 47h2 is supplied to the correction unit 47e2 when the input luminance signal input/output difference is 0 or more. On the other hand, when the input luminance signal input/output difference is less than 0, the selector control unit 47j2 controls the selector 47k2 such that an output of the negative side weight processing unit 47i2 is supplied to the correction unit 47e2.

An initial template for color correction processing is supplied to the correction unit 47e2 from the control unit 26 via the control terminal 49 and a control terminal 47l2. The initial template is set in advance for performing a basic correction processing to the color signal, and the initial template is a table parameter in which an amplitude level of the luminance signal Din and a reference correction value with respect to the color signal are made to correspond to each other.

Then, the correction unit 47e2 reads a reference correction value corresponding to the amplitude level of the luminance signal Din from the initial template, and adds the output from the selector 47k2 to the reference correction value to create the color correction coefficient. The correction unit 47e2 outputs the color correction coefficient to the multiplier 46 via an output terminal 47m2.

Figure 9:
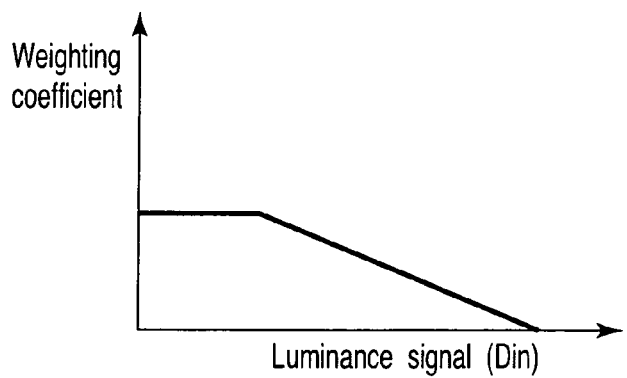
FIG. 9 is a view shown for explaining a characteristic of a positive side weight template of the color signal correction unit in the embodiment.

Here, FIG. 9 shows one example of a relation between the amplitude level of the luminance signal Din and the weighting coefficient in the positive side weight template 47c2. That is, in the positive side weight template 47c2, a characteristic is provided such that the weighting coefficient is made smaller in proportion to an increase in the amplitude level of the luminance signal Din.

Figure 10:
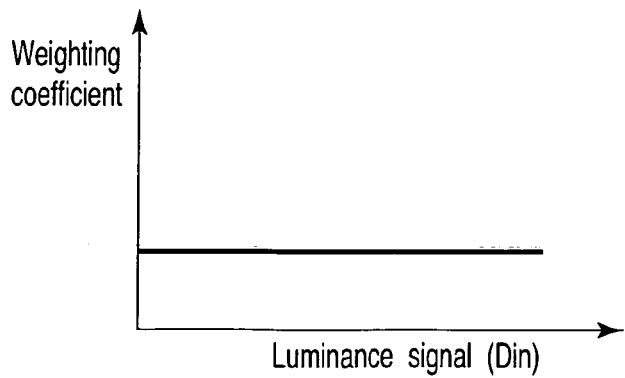
FIG. 10 is a view shown for explaining a characteristic of a negative side weight template of the color signal correction unit in the embodiment.

On the other hand, FIG. 10 shows one example of a relation between the amplitude level of the luminance signal Din and the weighting coefficient in the negative side weight template 47d2. That is, in the negative side weight template 47d2, a characteristic is provided such that the weighting coefficient becomes substantially constant irrespective of the amplitude level of the luminance signal Din.

In this manner, the weighting coefficient for performing an amplitude correction processing to the color signal is differed between the case in which the luminance signal input/output difference is 0 or more, namely, the non-linear correction processing is performed in a direction in which the amplitude level of the luminance signal is heightened and the case in which the luminance signal input/output difference is less than 0, namely, the non-linear correction processing is performed in a direction in which the amplitude level of the luminance signal is lowered.

Figure 11:
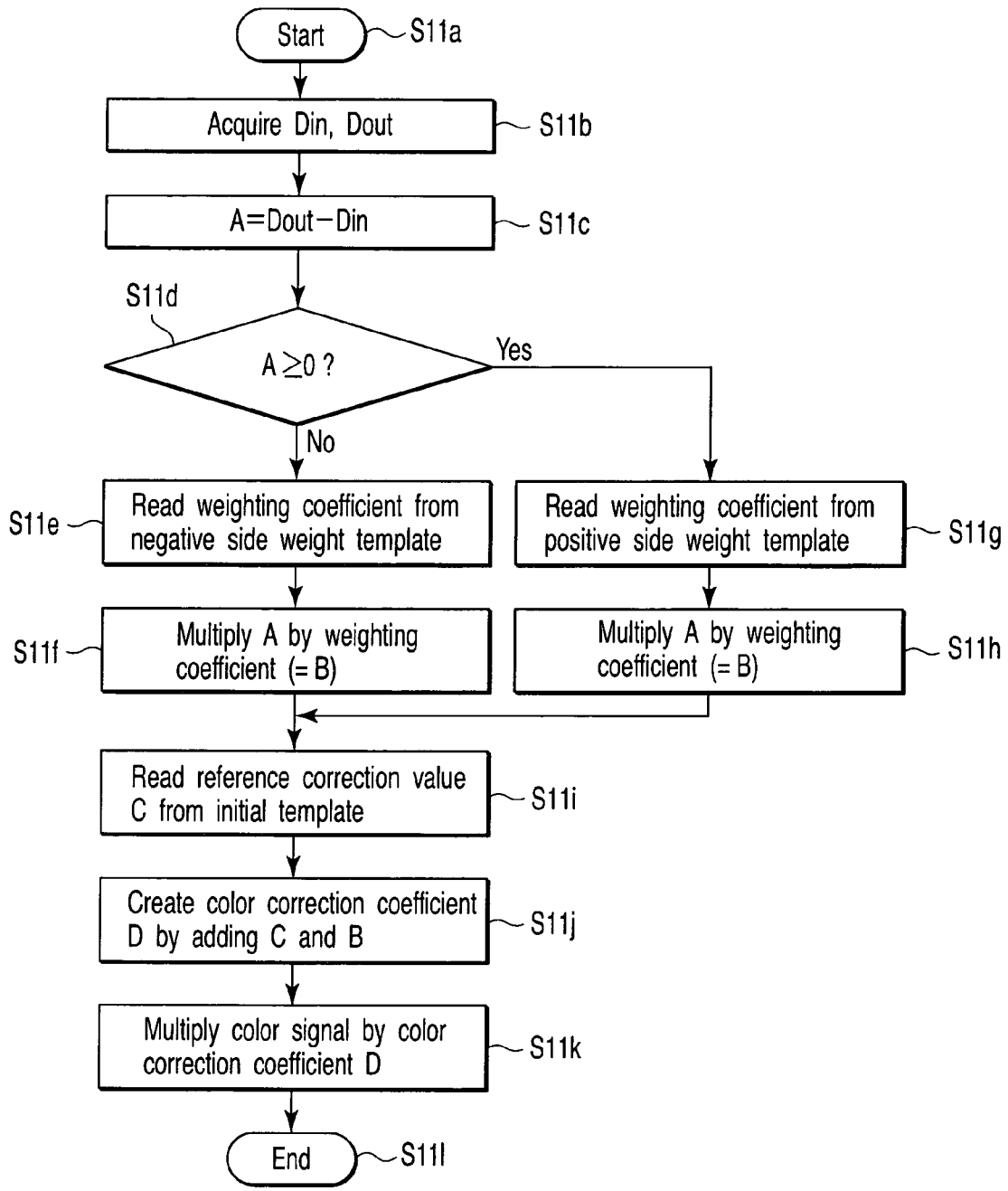
FIG. 11 is a flow chart shown for explaining a processing operation of the color signal correction unit in the embodiment.

FIG. 11 is a flow chart in which the processing operation of the color signal correction unit 47 shown in FIG. 8 is summarized. More specifically, when the processing is started (in block S11a), the subtractor unit 47b 2 acquires in block S11b the luminance signals Din, Dout before and after the non-linear correction processing by means of the luminance non-linear correction processing unit 42. In block S11c, the subtractor unit 47b2 calculates the luminance signal input/output difference A=Dout−Din.

Thereafter, the positive side and negative side weight processing units 47h2 and 47i1 respectively determine in block S11d whether or not the luminance signal input/output difference A is 0 or more. When it is determined the luminance signal input/output difference is less than 0 (NO), the negative side weight processing unit 47i2 reads in block S11e a weighting coefficient corresponding to the amplitude level of the luminance signal Din from the negative side weight template 47d2, and multiplies the luminance signal input/output difference A by the read weighting coefficient in block S11f. The calculation result at this time is denoted by symbol B.

On the other hand, when it is determined in block S11d that the luminance signal input/output difference A is 0 or more (YES), the positive side weight processing unit 47h2 reads in block S11g a weighting coefficient corresponding to the amplitude level of thee luminance signal Din from the positive side weight template 47c2, and multiplies the luminance signal input/output difference A by the read weighting coefficient in block S11h. The multiplication result at this time is denoted by symbol B.

After the block S11f or block S11h, the correction unit 47e2 reads in block S11i a reference correction value C corresponding to the amplitude level of the luminance signal Din from the initial template. In block S11j, the multiplication result B acquired in block S11f or in block S11h is added to the read reference correction value C to create a color correction coefficient D.

Thereafter, the multiplier 46 multiplies in block Sllk the color signal Cb/Cr by the color correction coefficient D to terminate the processing (in block S11l). As a result, an amplitude correction processing with respect to the color signal Cb/Cr is performed.

In the color signal correction unit 47 shown in FIG. 8, the same advantage as the color signal correction unit 47 shown in FIG. 4 can be obtained. In addition, it is not required to take measures for division in the case where the amplitude level of the luminance signal Din becomes 0. By just that much, it becomes possible to simplify the circuit configuration. However, a coefficient for converting the value of the luminance signal input/output difference A into a luminance signal input/output ratio changes in accordance with the luminance signal Din before the luminance non-linear correction processing. For this reason, it is required to consider the change in the coefficient in the table parameter given in the positive side and negative side weight templates 47c2 and 47d2.

Figure 12:
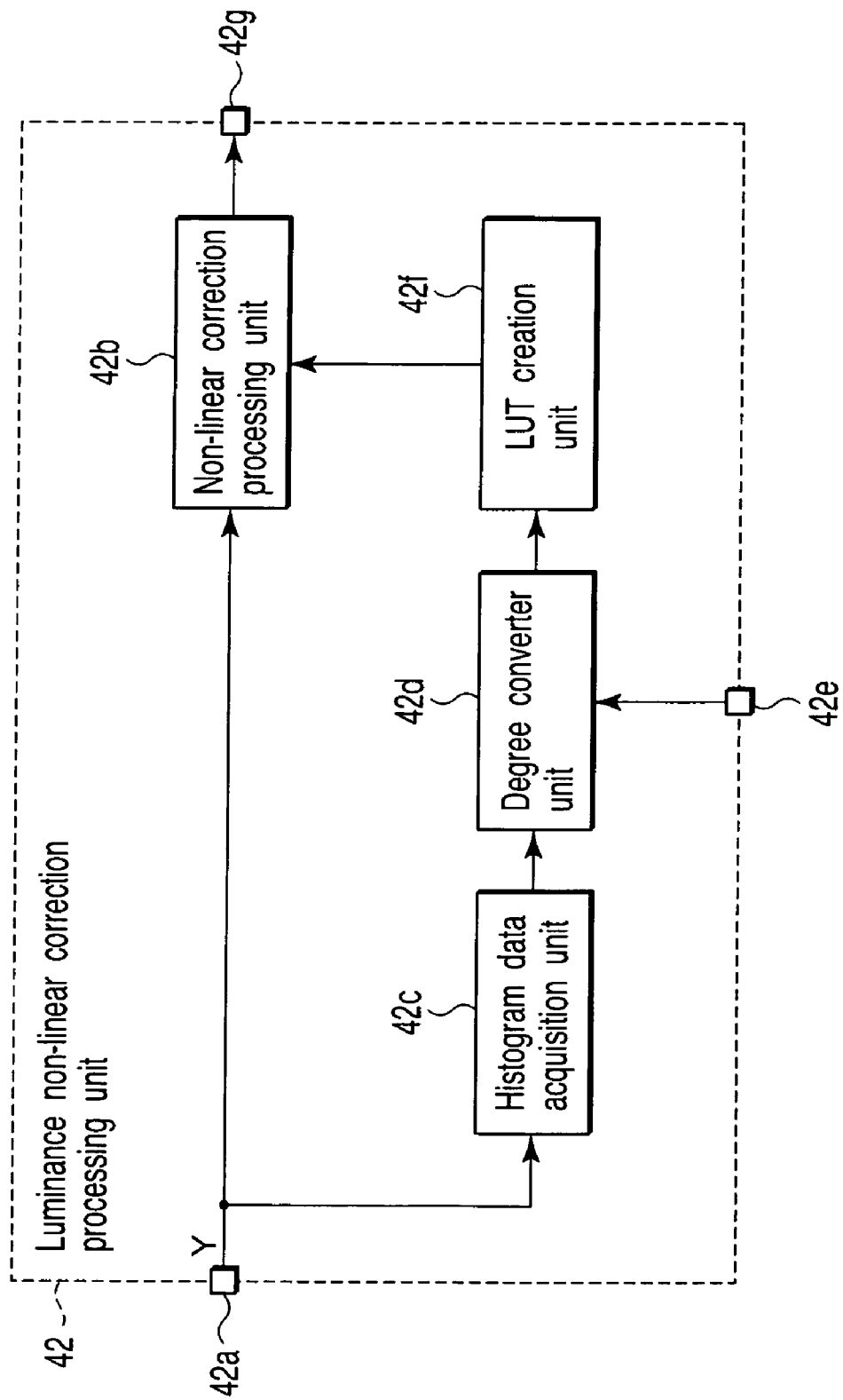
FIG. 12 is a block diagram shown for explaining one example of a luminance non-linear correction processing unit of the signal correction unit in the embodiment.

Here, FIG. 12 shows one example of the luminance non-linear correction processing unit 42. More specifically, the luminance signal Y supplied to the input terminal 41 passes through an input terminal 42a, and is then supplied to a non-linear correction processing unit 42b and supplied to a histogram data acquisition unit 42c. Out of these units, the histogram data acquisition unit 42c acquires histogram data on each luminance level with respect to the input luminance signal for one frame portion.

The histogram data acquired by the histogram acquisition unit 42c is supplied to a degree converter unit 42d. The degree converter unit 42d performs a degree conversion processing on the basis of a conversion parameter which is supplied from the control unit 26 via the control terminals 44 and 42e and which can be designated on the histogram data on each luminance level. Then, the degree converter unit 42d outputs the data to the LUT creation unit 42f.

The LUT creation unit 42f prepares an LUT for luminance non-linear correction processing on the basis of the input histogram data after the degree conversion, and outputs the LUT to the non-linear correction processing unit 42b. Then, the non-linear correction preparing portion 42b performs a non-linear correction processing based on the LUT with respect to the input luminance signal to be output to the color space converter unit 35 via output terminals 42g and 43.

Figure 13:
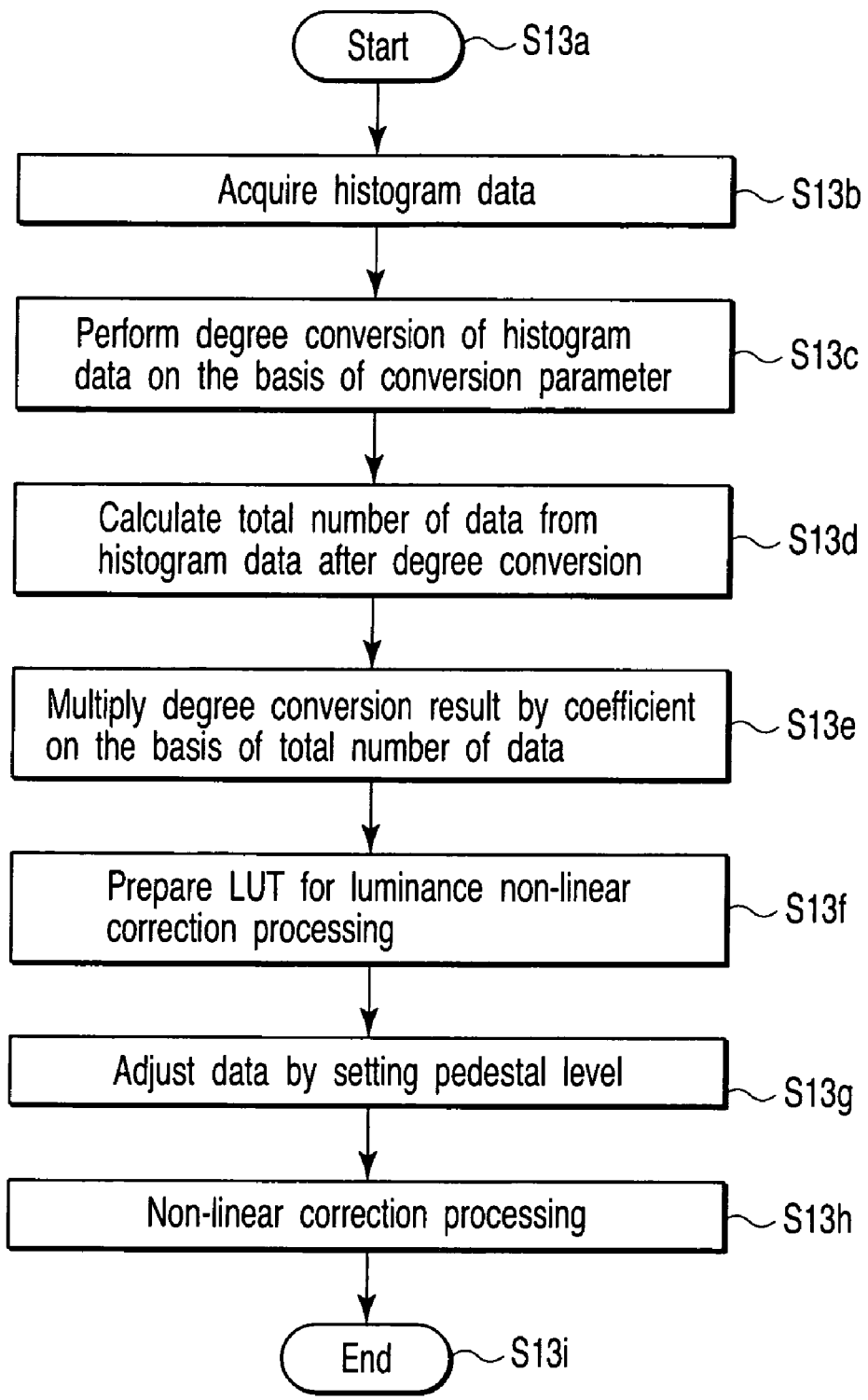
FIG. 13 is a flow chart shown for explaining a processing operation of the luminance non-linear correction processing unit in the embodiment.

FIG. 13 is a flow chart in which one example of the non-linear correction processing operation which is performed with respect to the luminance signal Y by means of the luminance non-linear correction processing unit 42 is summarized. That is, when the processing is started (in block S13a), the histogram data acquisition unit 42c acquires histogram data with respect to the luminance in block S13b.

The histogram data is acquired by detecting a luminance level for each pixel with respect to a picture signal for one frame portion and counting the number of pixels corresponding to each luminance level. In this case, the resolution of the luminance level can be set in a sufficiently fine manner. For example, in the case where the input signal level is 8 bits, the resolution of the luminance level at the time of acquiring the histogram data is set to 8 bits.

Figure 14:
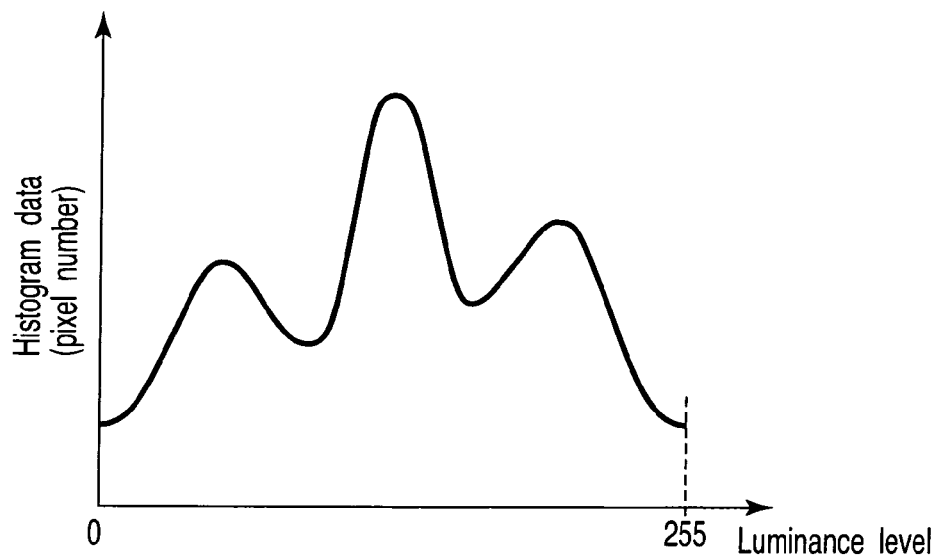
FIG. 14 is a view shown for explaining a histogram of one frame portion acquired by the luminance non-linear correction processing unit in the embodiment.

FIG. 14 shows one example of the histogram data of luminance for one frame portion acquired as described above. In this case, the resolution of the luminance level is set to 8 bits (0 to 255). In other words, pixels are acquired in the number corresponding to the 256 levels of luminance from 0 to 255. As a consequence, when all the numbers of pixels on the respective luminance levels are added, the sum total thereof becomes equal to the number of pixels in one frame portion possessed by the input picture signal.

Figure 15:
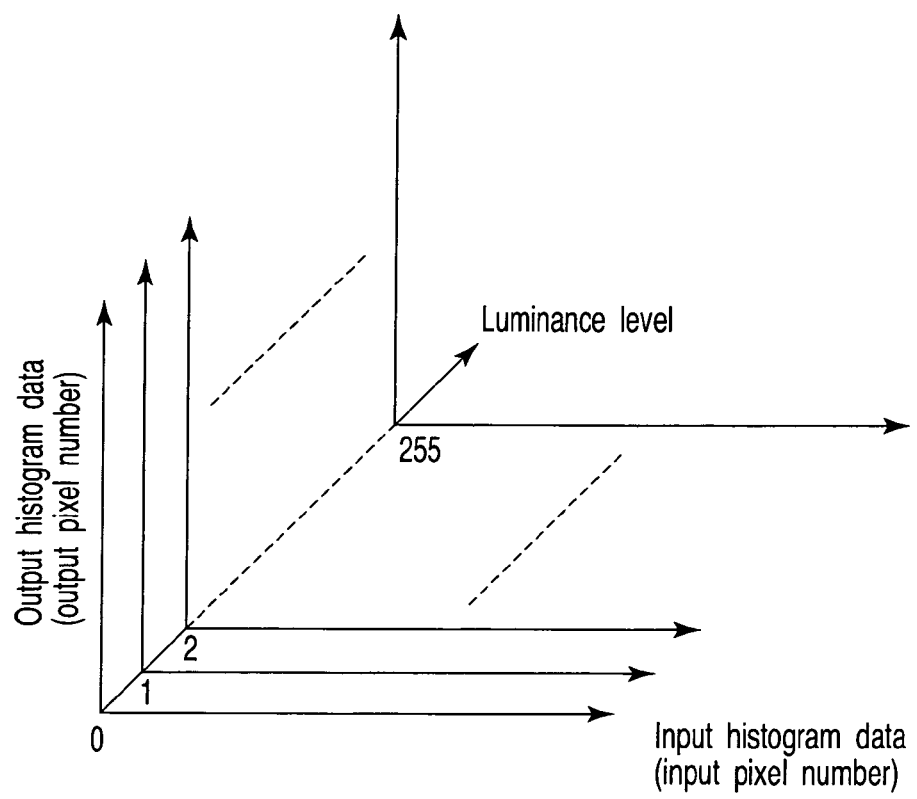
FIG. 15 is a view shown for explaining a conversion parameter given to the luminance non-linear correction processing unit in the embodiment.

Thereafter, the degree converter unit 42d performs a degree conversion processing with respect to the acquired histogram data on the basis of a conversion parameter supplied from the controller 26 in block S13c. The conversion parameter regulates output histogram data with respect to the input histogram data respectively for each of the luminance levels 0 to 255 as shown in FIG. 15.

Figure 16:
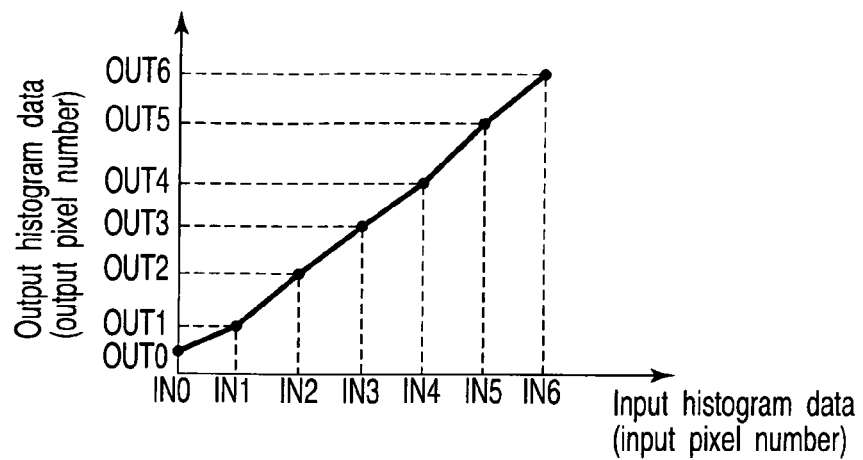
FIG. 16 is view shown for explaining the details of the conversion parameter given to the luminance non-linear correction processing unit in the embodiment.

FIG. 16 shows one example of a conversion parameter with respect to the luminance level 0. Since the amount of histogram data is extremely large in this conversion parameter, input histogram data is plotted in equal intervals, so that only output histogram data OUT0 to OUT6 corresponding to the plotted input histogram data positions IN0 to IN6 are regulated. The respective output histogram data OUT0 to OUT6 are handled by connected the data with straight lines.

Figure 17:
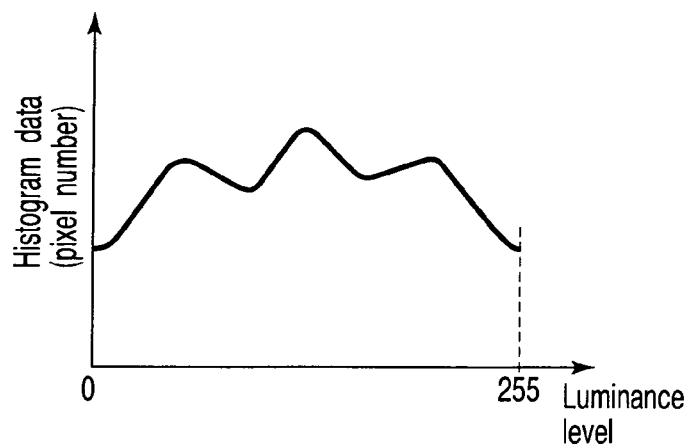
FIG. 17 is a view shown for explaining a degree conversion processing which is performed by the luminance non-linear correction processing unit in the embodiment on the basis of the conversion parameter.

Here, the histogram data shown in FIG. 14 are subjected to the degree conversion processing on the basis of the above-described conversion parameter, so that the degree conversion is performed as shown in, for example, FIG. 17. Thereafter, the LUT creation unit 42$f$ calculates the total number of data from the histogram data subjected to the degree conversion, namely, the total number of pixels corresponding to the range of 100% amplitude from the pedestal level of the picture signal.

Then, the LUT creation unit 42$f$ sets a conversion value showing 100% amplitude in block S13$e$, and multiplies the histogram data subjected to the degree conversion in block S13$c$ by a coefficient in such a manner that the total number of data acquired in block S13$d$ falls within the range of 10% amplitude from the pedestal level of the picture signal.

Thereafter, in block S13$f$, the LUT creation unit 42$f$ accumulates and adds the degree-converted histogram data multiplied by a coefficient from the low luminance level, so that a luminance input/output conversion parameter, namely, an LUT for luminance non-linear correction processing is created.

Figure 18:
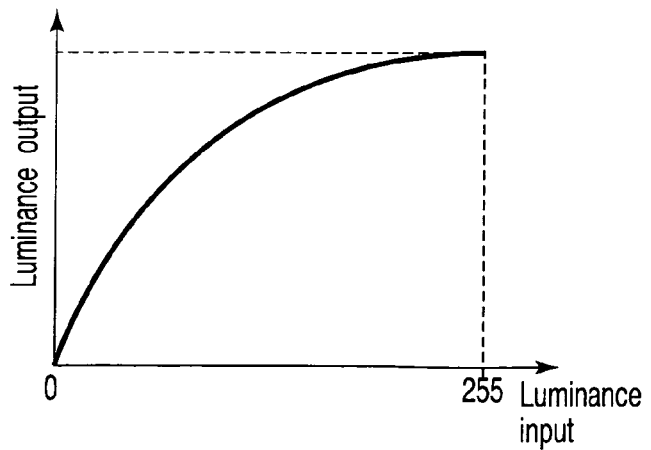
FIG. 18 is a view shown for explaining a non-linear correction processing which is performed by the luminance non-linear correction processing unit in the embodiment.

Then, in block S13$g$, the LUT creation unit 42$f$ sets the pedestal level to make an adjustment of data. In block S13$h$, the non-linear correction processing unit 42$b$ performs a non-linear correction processing with respect to the luminance signal Y on the basis of the LUT, and terminates the processing (in block S13$i$). FIG. 18 shows one example of a non-linear characteristic given to the picture signal Y with the LUT for luminance non-linear correction processing.

In the luminance processing unit 42 described above, a degree conversion processing is performed by means of the conversion parameter which enables designating histogram data respectively to the luminance levels. As a consequence, the control range of the gradation correction processing with respect to luminance can be flexibly varied, and the luminance control suitable for a practical use can be made.

Incidentally, a conversion parameter for performing a degree conversion processing to histogram data is not limited to one kind. For example, a plurality of kinds of parameters corresponding to, for example, a standard mode and a movie mode are prepared in advance in the non-volatile memory 30, thereby allowing users to set and select the brightness corresponding to the mode.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A picture signal processor comprising:
a first table which is set in advance in correspondence to a case in which a non-linear correction processing is performed in a direction in which an amplitude level of a luminance signal is heightened, the table being configured to allow an amplitude level of a luminance signal before the non-linear correction processing to correspond to a first coefficient;
a second table which is set in advance in correspondence to a case in which a non-linear correction processing is performed in a direction in which the amplitude level of the luminance signal is lowered, the table being configured to allow an amplitude level of a luminance signal before the non-linear correction processing to correspond to a second coefficient;
a determination unit configured to determine on the basis of the luminance signals before and after the non-linear correction processing whether the non-linear correction processing is performed in a direction in which the amplitude level of the luminance signal is heightened, or the non-linear correction processing is performed in a direction in which the amplitude level of the luminance signal is lowered; and
a color correction unit configured to perform an amplitude level correction processing to a color signal on the basis of the first coefficient read from the first table when the determination unit determines that the non-linear correction processing is performed in a direction in which the amplitude level of the luminance signal is heightened; and configured to perform an amplitude level correction processing to the color signal on the basis of the second coefficient read from the second table when the determination unit determines that the non-linear correction processing is performed in a direction in which the amplitude level of the luminance signal is lowered.

2. A picture signal processor according to claim 1, wherein the color correction unit comprises:
a third table configured to allow the amplitude level of the luminance signal before the non-linear correction processing to correspond to a reference correction value for correcting an amplitude of the color signal;
a correction unit configured to, when the determination unit determines that the non-linear correction processing is performed in a direction in which the amplitude level of the luminance signal is heightened, create a color correction coefficient by correcting the reference correction value read from the third table in correspondence to the amplitude level of the luminance signal before the non-linear correction processing on the basis of the first coefficient read from the first table in correspondence to the amplitude level of the luminance signal before the non-linear correction processing; and configured to, when the determination unit determines that the non-linear correction processing is performed in a direction in which the amplitude level of the luminance signal is lowered, create a color correction coefficient by correcting the reference correction value read from the third table in correspondence to the amplitude level of the luminance signal before the non-linear correction processing on the basis of the second coefficient read from the second table in correspondence to the amplitude level of the luminance signal before the non-linear correction processing; and
a calculation unit configured to multiply the color signal by the color correction coefficient created by the correction unit.

3. A picture signal processor according to claim 1, wherein the determination unit is configured to determine on the basis of a ratio between the amplitude level of the luminance signal before the non-linear correction processing and the amplitude level of the luminance signal after the non-linear correction processing whether the non-linear correction is performed in a direction in which the amplitude level of the luminance signal is heightened or the non-linear correction is performed in a direction in which the amplitude level of the luminance signal is lowered.

4. A picture signal processor according to claim 3, wherein the color correction unit comprises:
   a first processing unit configured to perform a calculation processing for the first coefficient read from the first table in correspondence to the amplitude level of the luminance signal before the non-linear correction processing and an amplitude level ratio of the luminance signals before and after the non-linear correction processing;
   a second processing unit configured to perform a calculation processing for the second coefficient read from the second table in correspondence to the amplitude level of the luminance signal before the non-linear correction processing and an amplitude level ratio of the luminance signals before and after the non-linear correction processing;
   a third table configured to allow the amplitude level of the luminance signal before the non-linear correction processing to correspond to a reference correction value for correcting an amplitude of the color signal;
   a creation unit configured to, when the determination unit determines that the non-linear correction processing is performed in a direction in which the amplitude level of the luminance signal is heightened, create a color correction coefficient by calculating an output of the first processing unit and the reference correction value read from the third table in correspondence to the amplitude level of the luminance signal before the non-linear correction processing; and configured to, when the determination unit determines that the non-linear correction processing is performed in a direction in which the amplitude level of the luminance signal is lowered, create a color correction coefficient by calculating an output of the second processing unit and the reference correction value read from the third table in correspondence to the amplitude level of the luminance signal before the non-linear correction processing; and
   a calculation unit configured to multiply the color signal by the color correction coefficient output from the creation unit.

5. A picture signal processor according to claim 3, wherein the determination unit is configured to output a value set in advance as a determination result in the case where an amplitude level which configures a denominator is 0 at the time of calculating the ratio between the amplitude level of the luminance signal before the non-linear correction processing and the amplitude level of the luminance signal after the non-linear correction processing.

6. A picture signal processor according to claim 1, wherein the determination unit determines on the basis of a difference between the amplitude level of the luminance signal before the non-linear correction processing and the amplitude level of the luminance signal after the non-linear correction processing whether the non-linear correction processing is performed in a direction in which the amplitude level of the luminance signal is heightened or the non-linear correction processing is performed in a direction in which the amplitude level of the luminance signal is lowered.

7. A picture signal processor according to claim 6, wherein the color correction unit comprises:
   a first processing unit configured to perform a calculation processing for the first coefficient read from the first table in correspondence to the amplitude level of the luminance signal before the non-linear correction processing and a difference in amplitude level between the luminance signals before and after the non-linear correction processing;
   a second processing unit configured to perform a calculation processing for the second coefficient read from the first table in correspondence to the amplitude level of the luminance signal before the non-linear correction processing, and a difference in amplitude level between the luminance signals before and after the non-linear correction processing;
   a third table configured to allow the amplitude level of the luminance signal before the non-linear correction processing to correspond to a reference correction value for correcting an amplitude of the color signal;
   a creation unit configured to, when the determination unit determines that the non-linear correction processing is performed in a direction in which the amplitude level of the luminance signal is heightened, create a color correction coefficient by calculating an output of the first processing unit and the reference correction value read from the third table in correspondence to the amplitude level of the luminance signal before the non-linear correction processing; and configured to, when the determination unit determines that the non-linear correction processing is performed in a direction in which the amplitude level of the luminance signal is lowered, create a color correction coefficient by calculating an output of the second processing unit and the reference correction value read from the third table in correspondence to the amplitude level of the luminance signal before the non-linear correction processing; and
   a calculation unit configured to multiply the color signal by the color correction coefficient output from the creation unit.

8. An image display device comprising:
   a non-linear correction processing unit configured to perform a non-linear correction processing to the luminance signal;
   a first table which is set in advance in correspondence to a case in which the non-linear correction processing unit performs a non-linear correction processing in a direction in which an amplitude level of a luminance signal is heightened, the table being configured to allow an amplitude level of a luminance signal before the non-linear correction processing to correspond to a first coefficient;
   a second table which is set in advance in correspondence to a case in which a non-linear correction processing unit performs a non-linear correction processing in a direction in which the amplitude level of the luminance signal is lowered, the table being configured to allow an amplitude level of a luminance signal before the non-linear correction processing to correspond to a second coefficient;
   a determination unit configured to determine on the basis of the luminance signals before and after the non-linear correction processing whether the non-linear correction processing is performed, or the non-linear correction processing is performed in a direction in which the amplitude level of the luminance-signal is lowered;
   a color correction unit configured to, when the determination unit determines that the non-linear correction processing is performed in a direction in which the amplitude level of the luminance signal is heightened, perform an amplitude level correction processing to a color signal on the basis of the first coefficient read from the first tables; and configured to, when the determination unit determines that the non-linear correction processing is performed in a direction in which the amplitude level of the luminance signal is lowered, perform an amplitude level correction processing to the color signal on the basis of the second coefficient read from the second table; and a display unit configured to perform an image display on the basis of the color signal to which the amplitude correction processing has been performed by the color correction unit and the luminance signal to which the non-linear correction processing has been performed by the non-linear correction processing unit.

9. A picture signal processing method by means of a device comprising:

a first table which is set in advance in correspondence to a case in which a non-linear correction processing is performed in a direction in which an amplitude level of a luminance signal is heightened, the table being configured to allow an amplitude level of a luminance signal before the non-linear correction processing to correspond to a first coefficient; and a second table which is set in advance in correspondence to a case in which a non-linear correction processing is performed in a direction in which the amplitude level of the luminance signal is lowered, the table being configured to allow an amplitude level of a luminance signal before the non-linear correction processing to correspond to a second coefficient, the method comprising:

a first block of determining on the basis of the luminance signals before and after the non-linear correction processing whether the non-linear correction processing is performed in a direction in which the amplitude level of the luminance signal is heightened, or the non-linear correction processing is performed in a direction in which the amplitude level of the luminance signal is lowered;

a second block of, when it is determined in the first block that the non-linear correction processing is performed in a direction in which the amplitude level of the luminance signal is heightened, performing an amplitude level correction processing to a color signal on the basis of the first coefficient read from the first table; and a third block of, when it is determined in the first block that the non-linear correction processing is performed in a direction in which the amplitude level of the luminance signal is lowered, performing an amplitude level correction processing to the color signal on the basis of the second coefficient read from the second table.

10. A picture signal processing method according to claim 9, wherein the first block determines on the basis of any one of a ratio and a difference between the amplitude level of the luminance signal before the non-linear correction processing and the amplitude level of the luminance signal after the non-linear correction processing whether the non-linear correction processing is performed in a direction in which the amplitude level of the luminance signal is heightened, or the non-linear correction processing is performed in a direction in which the amplitude level of the luminance signal is lowered.

11. A picture signal processing method according to claim 9, wherein a third table is further provided which is configured to allow the amplitude level of the luminance signal before the non-linear correction processing to correspond to a reference correction value for correcting an amplitude of the color signal, when it is determined in the first block that the non-linear correction processing is performed in a direction in which the amplitude level of the luminance signal is heightened, the second block creates a color correction coefficient by correcting the reference correction value read from the third table in correspondence to the amplitude level of the luminance signal before the non-linear correction processing on the basis of the first coefficient read from the first table in correspondence to the amplitude level of the luminance signal before the non-linear correction processing, and multiplies the color signal by the created color correction coefficient, and when it is determined in the first block that the non-linear correction processing is performed in a direction in which the amplitude level of the luminance signal is lowered, the third block creates a color correction coefficient by correcting the reference correction value read from the third table in correspondence to the amplitude level of the luminance signal before the non-linear correction processing on the basis of the second coefficient read from the second table in correspondence to the amplitude level of the luminance signal before the non-linear correction processing, and multiplies the color signal by the created color correction coefficient.

* * * * *

UNITED STATES PATENT AND TRADEMARK OFFICE
CERTIFICATE OF CORRECTION

PATENT NO. : 7,796,196 B2
APPLICATION NO. : 11/493639
DATED : September 14, 2010
INVENTOR(S) : Miyazawa It is certified that error appears in the above-identified patent and that said Letters Patent is hereby corrected as shown below:

Claim 8, column 14, line 62, change "luminance-signal" to --luminance signal--.

Signed and Sealed this

Twenty-third Day of November, 2010

David J. Kappos
*Director of the United States Patent and Trademark Office*